(12) United States Patent
Wang et al.

(10) Patent No.: US 9,170,695 B2
(45) Date of Patent: *Oct. 27, 2015

(54) SEAMLESS CAPACITIVE TOUCH PANEL

(71) Applicant: Wistron Corporation, New Taipei (TW)

(72) Inventors: Kuei-Ching Wang, New Taipei (TW);
Hsing-Chiao Lin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 102 days.

This patent is subject to a terminal disclaimer.

(21) Appl. No.: 14/159,373

(22) Filed: Jan. 20, 2014

(65) Prior Publication Data

US 2014/0125630 A1     May 8, 2014

Related U.S. Application Data

(63) Continuation-in-part of application No. 13/223,321, filed on Sep. 1, 2011, now Pat. No. 8,680,419.

(51) Int. Cl.
*H03K 17/975* (2006.01)
*G06F 3/044* (2006.01)

(52) U.S. Cl.
CPC ...... *G06F 3/044* (2013.01); *G06F 2203/04111* (2013.01)

(58) Field of Classification Search
USPC .......................................... 200/600; 345/173
See application file for complete search history.

(56) References Cited

U.S. PATENT DOCUMENTS

| 7,030,860 | B1 | 4/2006 | Hsu |
| 8,358,284 | B2 | 1/2013 | Jeong |
| 8,680,419 | B2* | 3/2014 | Wang et al. .................. 200/600 |
| 2009/0277695 | A1 | 11/2009 | Liu |
| 2010/0261119 | A1 | 10/2010 | Li |
| 2011/0063232 | A1 | 3/2011 | Li |
| 2012/0044182 | A1* | 2/2012 | Seo et al. ...................... 345/173 |

FOREIGN PATENT DOCUMENTS

| CN | 101916154 A | 12/2010 |
| JP | 58166437 A | 10/1983 |
| JP | 2008134975 A | 6/2008 |

(Continued)

OTHER PUBLICATIONS

Office action mailed on Jan. 20, 2015 for the China application No. 201110242357.7, filing date: Aug. 23, 2011, p. 3-5.
Office action mailed on Jan. 30, 2013 for the Taiwan application No. 099106041, filing date: Mar. 2, 2010, p. 1 line 1, line 8-13 and line 17-30, p. 2-3 and p. 4 line 1-17.

(Continued)

*Primary Examiner* — Vanessa Girardi
(74) *Attorney, Agent, or Firm* — Winston Hsu; Scott Margo

(57) ABSTRACT

A seamless capacitive touch panel includes a substrate, a pattern layer, a first electrode, and a second electrode. The pattern layer is formed on the substrate. The first electrode is formed on the pattern layer. The second electrode is formed on the substrate. The first electrode and the second electrode are separated by the pattern layer for preventing conduction between the first and second electrodes.

17 Claims, 9 Drawing Sheets

(56) References Cited

FOREIGN PATENT DOCUMENTS

| JP | 2008269605 | A | 11/2008 |
| JP | 2010182027 | A | 8/2010 |
| JP | 2010211647 | A | 9/2010 |
| KR | 1020100084263 | A | 7/2010 |
| TW | 200941323 | | 10/2009 |
| TW | 200945129 | | 11/2009 |
| WO | 2007091311 | A1 | 8/2007 |

OTHER PUBLICATIONS

Notice of allowance mailed on May 15, 2013 for the Korean application No. 10-2011-0087340, filing date: Aug. 30, 2011, p. 1-2.
Office action mailed on May 16, 2013 for the Taiwan application No. 099106041, filing date Mar. 2, 2010, p. 1 line 1, line 11-13 and line 18-19, p. 2-3 and p. 4 line 1-3.
Office action mailed on Aug. 6, 2013 for the Japan application No. 2011-187004, filed: Aug. 30, 2011, p. 1 and p. 2 line 1-25.

* cited by examiner

SEAMLESS CAPACITIVE TOUCH PANEL

CROSS REFERENCE TO RELATED APPLICATIONS

This is a continuation-in-part application of application Ser. No. 13/223,321, filed Sep. 1, 2011.

BACKGROUND OF THE INVENTION

1. Field of the Invention

The present invention relates to a capacitive touch panel, and more particularly, to a seamless capacitive touch panel.

2. Description of the Prior Art

In recent years, mobile phones with touch panels have become more and more popular in the market. Therefore, more developers are developing various types of touch panels. Among those touch panels, capacitive touch panels have better endurance and feel, and have become the next generation of touch panels instead of resistive touch panels. However, the capacitive touch panel has higher cost, which is the main reason the capacitive touch panels have not enjoyed wider implementation in consumer products.

Please refer to FIG. 1, which is a diagram showing electrodes of a projected capacitive touch device of the prior art. The projected capacitive touch device senses a touched position by the two layers of the electrodes. The projected capacitive touch device comprises a substrate (not shown), such as a glass substrate. A cover layer (not shown) is arranged on the glass substrate. A Y-axis electrode layer 12 is arranged on an upper surface of the glass substrate. The Y-axis electrode layer 12 comprises a plurality of Y-axis electrodes y1, y2, y3, y4 separated from each other by a fixed distance. An X-axis electrode layer 11 is arranged on a lower surface of the glass substrate. The X-axis electrode layer 11 comprises a plurality of X-axis electrodes x1, x2, x3, x4 separated from each other by a fixed distance. The Y-axis electrodes y1, y2, y3, y4 are orthogonal to the X-axis electrodes x1, x2, x3, x4. When a finger touches or is close to the cover layer, a capacitance value between the X-axis electrode and the Y-axis electrode at the touched position changes. After sensing the change of the capacitance value by a sensing circuit, an X-axis coordinate and a Y-axis coordinate of the touched position can be determined. The above capacitive touch device needs the X-axis electrodes and the Y-axis electrodes to be arranged on the lower surface and the upper surface of the glass substrate respectively, or on a same surface of the glass substrate with an isolating layer to separate the X-axis electrodes from the Y-axis electrodes.

Please refer to FIG. 2, FIG. 2 is a cross-sectional view of a capacitive touch panel of the prior art. The capacitive touch panel comprises a transparent substrate 21 and a transparent cover plate 25. A lower transparent conductive layer 22, an isolating layer 23, and an upper transparent conductive layer 24 are sequentially formed on the transparent substrate 21. The transparent cover plate is bonded to the transparent substrate 21 by optical clear adhesive 26 to form the capacitive touch panel. As shown in FIG. 1, the capacitive touch panel comprises the X-axis electrodes and the Y-axis electrodes. The X-axis electrodes are formed at the lower transparent conductive layer 22, and the Y-axis electrodes are formed at the upper transparent conductive layer 24. However, the X-axis electrodes and the Y-axis electrodes are formed at different transparent conductive layers. When the X-axis electrodes and the Y-axis electrodes are not aligned properly, a thin line can be seen at a seam between the X-axis electrode and the Y-axis electrode, which affects image quality of a touch screen.

SUMMARY OF THE INVENTION

The present invention provides a capacitive touch panel comprising a substrate, a raised pattern layer, a first electrode, and a second electrode. The substrate has a surface. The raised pattern layer is formed directly on a first portion of the surface of the substrate. The raised pattern layer has a bottom surface, a top surface opposite to the bottom surface, and a surrounding edge connected between the top surface and the bottom surface. The first electrode is formed directly on the top surface of the pattern layer. The second electrode is formed directly on a second portion of the surface of the substrate adjacent to the raised pattern layer so that a capacitance is formed between the first electrode and the second electrode. The second electrode and the first electrode are disposed at different heights on the substrate and separated by the raised pattern layer for preventing conduction between the first and second electrodes and reducing of a seam between the first and second electrodes when viewing from a top.

The present invention further provides a method of fabricating a capacitive touch pad, comprising forming a raised pattern layer directly on a first portion of a surface of a substrate, the raised pattern layer having a bottom surface, a top surface opposite to the bottom surface, and a surrounding edge connected between the top surface and the bottom surface; forming a first electrode directly on the top surface of the pattern layer; and forming a second electrode directly on a second portion of the surface of the substrate; wherein the second electrode and the first electrode are disposed at different heights on the substrate and separated by the raised pattern layer for preventing conduction between the first and second electrodes and reducing of a seam between the first and second electrodes when viewing from a top.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
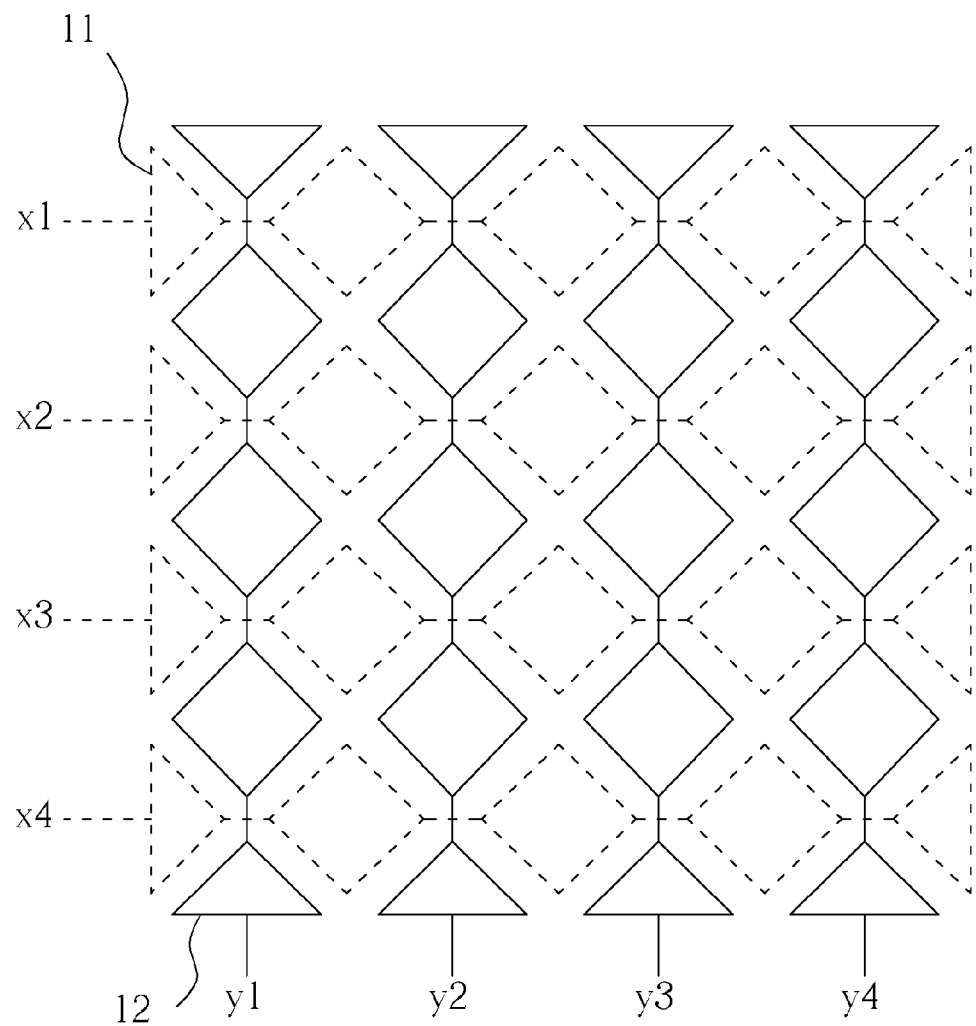
FIG. 1 is a diagram showing electrodes of a projected capacitive touch device of the prior art.
Figure 2:
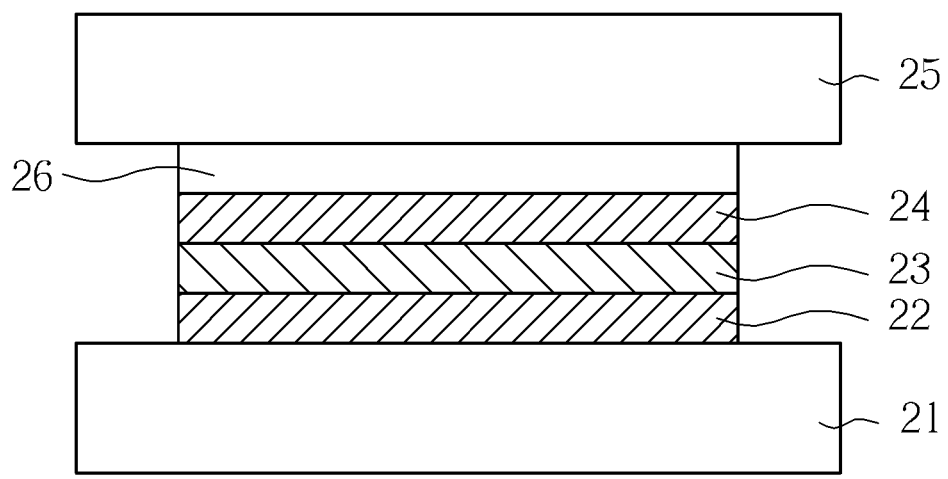
FIG. 2 is a cross-sectional view of a capacitive touch panel of the prior art.

Please refer to FIG. 3 to FIG. 6. FIG. 3 to FIG. 6 illustrate a first embodiment of a capacitive touch panel of the present invention. The capacitive touch panel of the present invention comprises X-axis electrodes and Y-axis electrodes. One arrangement of the X-axis electrodes and Y-axis electrodes can be seen in FIG. 1. The capacitive touch panel of the present invention utilizes a pattern layer to separate electrodes in order to eliminate seams between electrodes, and further improve image quality of a touch screen.

Figure 3:
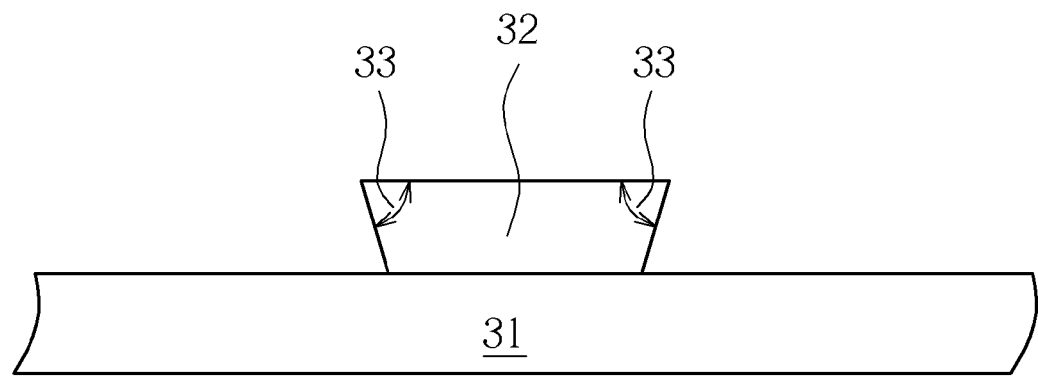
FIG. 3 to FIG. 6 are diagrams illustrating a first embodiment of a capacitive touch panel of the present invention.

As shown in FIG. 3, first, a layer of photoresist is applied on a substrate 31 (such as by spin-coat). The substrate 31 can be any kind of flexible substrate, or hard substrate such as a glass substrate, a plastic substrate, or a quartz substrate. In addition, the capacitive touch panel of the present invention can be integrated with a display panel to become a touch display panel. For example, the capacitive touch panel can be formed on the substrate 31. After finishing the capacitive touch panel, the capacitive touch panel can be attached to a display panel. Moreover, the capacitive touch panel and the display panel can share a same substrate, that is the substrate 31 can be a substrate of the display panel, such as a color filter glass substrate of the display panel. After forming the capacitive touch panel on the color filter glass substrate, the color filter glass substrate can be assembled with other parts to form the touch display panel. After applying the layer of photoresist to the substrate 31, a first mask is utilized to perform a photolithography processes on the photoresist layer, in order to form a pattern layer 32 for X-axis electrodes. The processes to form the pattern layer 32 comprise first forming the photoresist layer on the substrate 31, utilizing a mask (such as a gray scale mask, a halftone mask, or a phase shift mask) to perform an exposure process, and performing a development process on the photoresist layer to form the pattern layer 32 for X-axis electrodes. A step is formed between the pattern layer for X-axis electrodes and the substrate 31. In a preferred embodiment, after the development process, an area of a top surface of the pattern layer 32 is greater than an area of a bottom surface of the pattern layer 32, such that undercuts are formed at edges of the pattern layer 32, which make an angle 33 of the edge less than 90 degrees.

Figure 4:
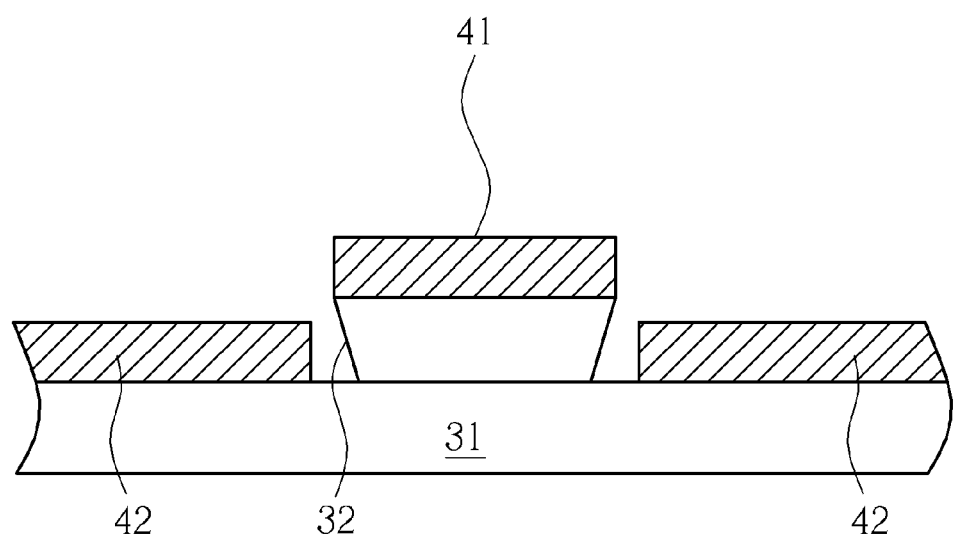

As shown in FIG. 4, a transparent conductive layer is deposited on the substrate 31 by surface application, sputter coating, evaporation coating, chemical vapor deposition, screen printing, or pad printing. The transparent conductive layer can be made of any kind of transparent conductive material such as indium tin oxide (ITO), antimony tin oxide (ATO), indium zinc oxide (IZO), aluminum zinc oxide (AZO), gallium zinc oxide (GZO), micaceous iron oxide (MIO), or metal oxide selected from titanium oxide, zinc oxide, zirconium oxide, antimony oxide, indium oxide, tin oxide, aluminum oxide, or silicon oxide. The transparent conductive layer can be formed by any thin film technique, such as physical vapor deposition or chemical vapor deposition. Due to the undercut and the step between the pattern layer 32 and the substrate 31, the transparent conductive layer formed on the pattern layer 32 and the transparent conductive layer formed on the substrate 31 are separated by the pattern layer 32. The transparent conductive layer formed on the pattern layer 32 further forms an X-axis electrode 41. The transparent conductive layer formed on the substrate 31 needs to have its connection cut in the X-axis direction to further form a Y-axis electrode 42. Therefore, a second mask is utilized to perform photolithography and etch processes in order to form the Y-axis electrode 42. The X-axis electrode 41 and the Y-axis electrode 42 are separated by the pattern layer 32 due to the undercut of the pattern layer 32.

Figure 5:
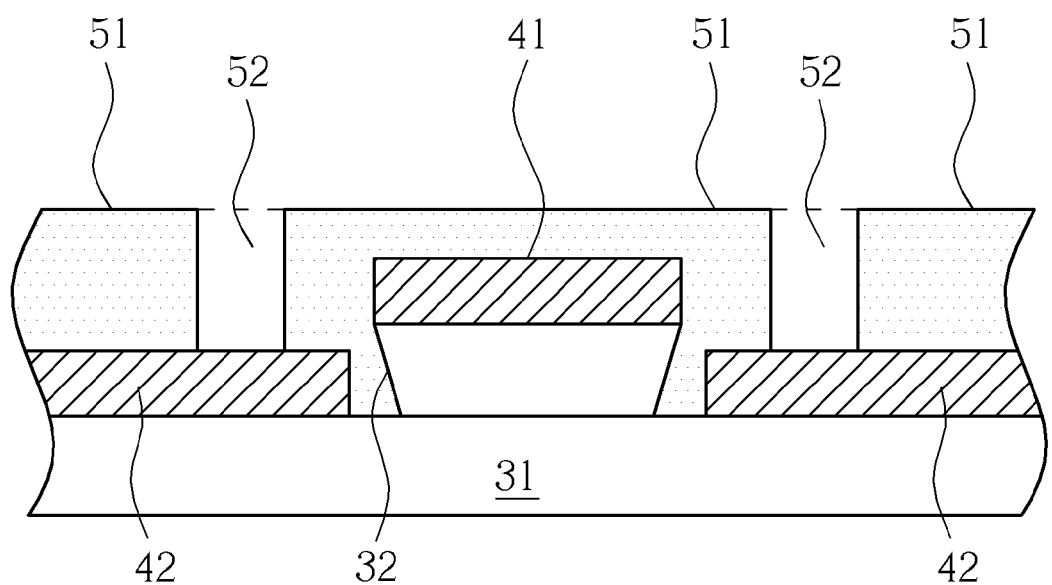

As shown in FIG. 5, an isolating layer 51 is formed on the X-axis electrode 41 and the Y-axis electrode 42. The X-axis electrode 41 and the Y-axis electrode 42 are separated by the pattern layer 32 for preventing conduction between the X-axis electrode 41 and the Y-axis electrode 42. A section of the Y-axis electrode 42 is also separated from another section of the Y-axis electrode 42 by the pattern layer 32. A third mask is utilized to perform photolithography and etch processes in order to form through holes 52 on the isolating layer 51, for electrically connecting the two sections of the Y-axis electrode 42.

Figure 6:
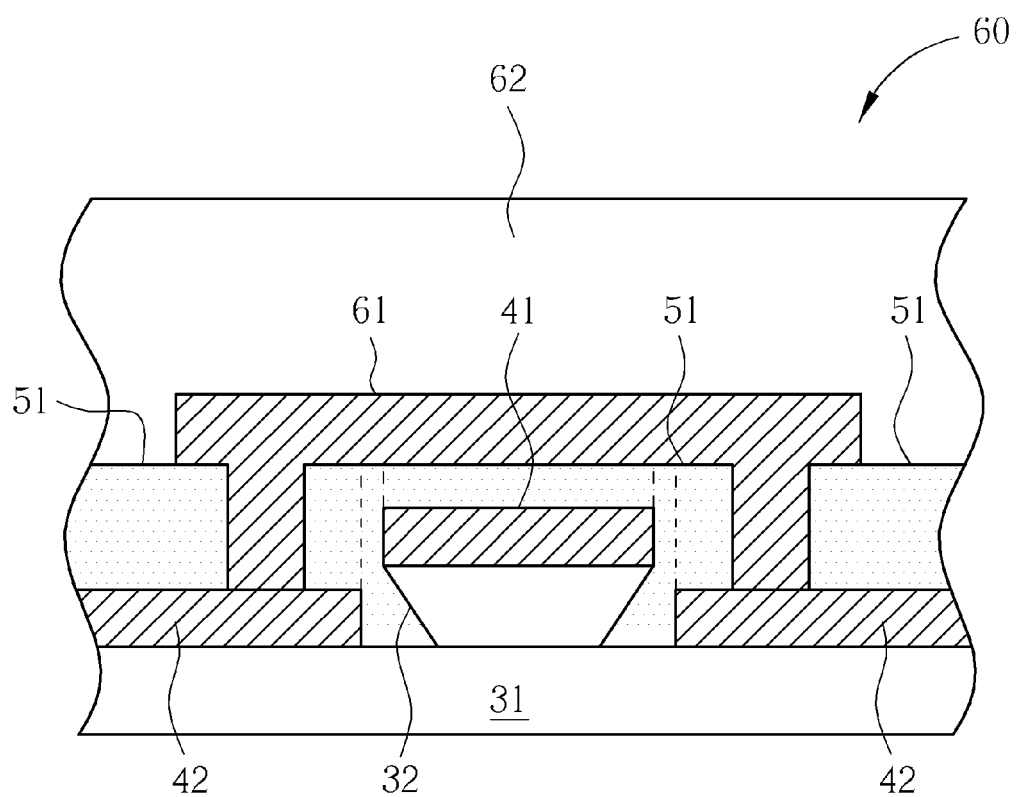

As shown in FIG. 6, a conductive layer 61 is formed on the isolating layer 51 for electrically connecting the two sections of the Y-axis electrode 42. Thereafter, a protection layer 62 is formed above. The conductive layer 61 can be a metal conductive layer. Because an area of a connection between the two sections of the Y-axis electrode 42 is small, the non-transparent metal conductive layer does not affect transmittance of the touch panel, and the metal conductive layer provides better conductivity. A fourth mask is utilized to perform photolithography and etch processes in order to form the conductive layer 61 for electrically connecting the two sections of the Y-axis electrode 42.

FIG. 6 is a diagram showing a structure of the first embodiment of the capacitive touch panel of the present invention. The capacitive touch panel comprises the substrate 31, the pattern layer 32, the X-axis electrode 41, the Y-axis electrode 42, the isolating layer 51, the conductive layer 61, and the protection layer 62. The X-axis electrode 41 of the present invention is formed on the pattern layer 32. The X-axis electrode 41 and the Y-axis electrode 42 are orthogonal to each other. The X-axis electrode 41 and the Y-axis electrode 42 are separated by the pattern layer 32 for preventing conduction between the X-axis electrode 41 and the Y-axis electrode 42, such that a capacitance is formed between the X-axis electrode 41 and the Y-axis electrode 42. An orthographic projection of the X-axis electrode 41 is close to an orthographic projection of the Y-axis electrode 42. According to the above arrangement, there is no seam between the X-axis electrode 41 and the Y-axis electrode 42 when viewing from a top.

Figure 7:
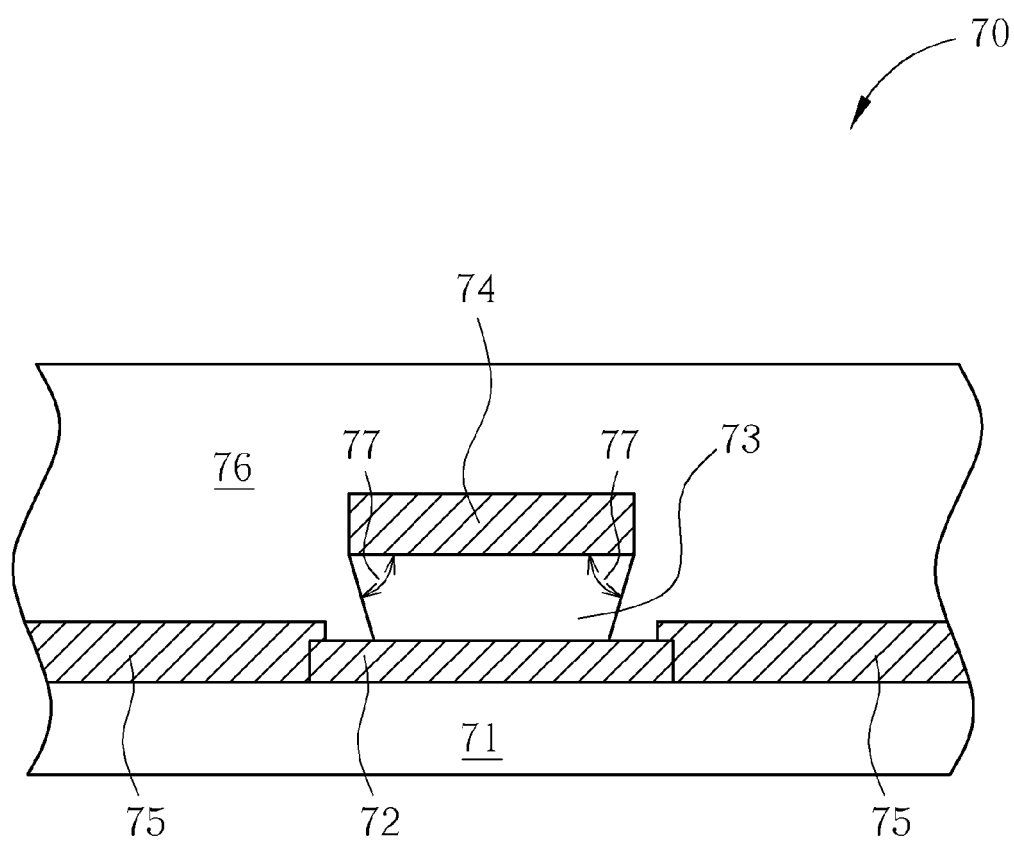
FIG. 7 is a cross-sectional view of a second embodiment of the capacitive touch panel of the present invention.

Please refer to FIG. 7, which is a cross-sectional view of a second embodiment of the capacitive touch panel of the present invention. The capacitive touch panel 70 comprises a substrate 71, a conductive layer 72, a pattern layer 73, an X-axis electrode 74, a Y-axis electrode 75, and a protection layer 76. In the second embodiment, the conductive layer 72 is formed on the substrate 71 for electrically connecting two sections of the Y-axis electrode 75. The conductive layer 72 is formed beneath the pattern layer 73, such that the isolating layer 51 and the through holes 52 in FIG. 6 are not necessary. Similarly, the X-axis electrode 74 is formed on the pattern layer 73, and the X-axis electrode 74 and the Y-axis electrode 75 are orthogonal to each other. Because there are undercuts formed at edges of the pattern layer 73, which make an angle 77 of the edge less than 90 degrees, the X-axis electrode 74 and the Y-axis electrode 75 are separated by the pattern layer 73 due to the undercuts, for preventing conduction between the X-axis electrode 74 and the Y-axis electrode 75. According to the above arrangement, there is no seam between the X-axis electrode 74 and the Y-axis electrode 75 when viewing from a top.

Figure 8:
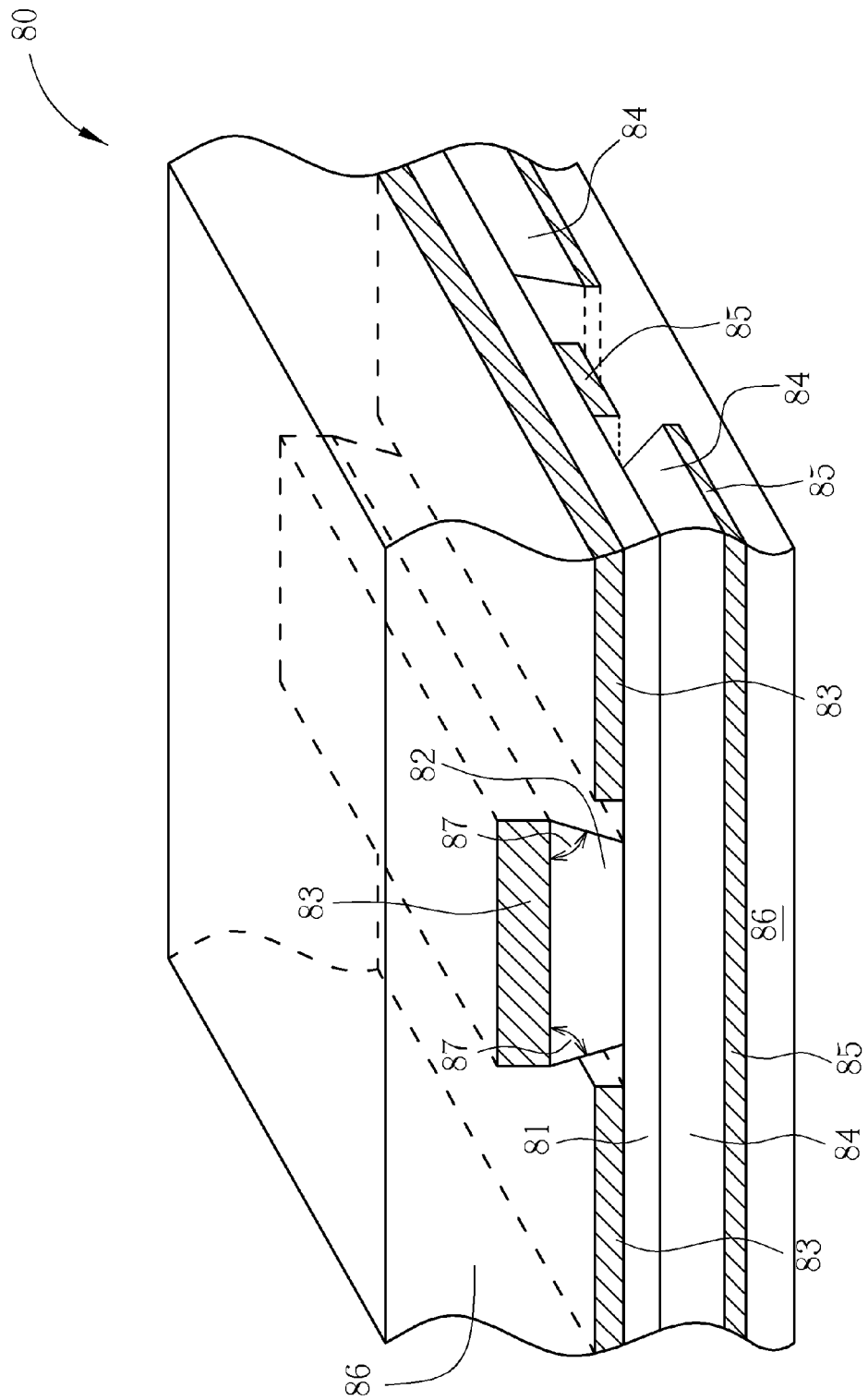
FIG. 8 is a cross-sectional view of a third embodiment of the capacitive touch panel of the present invention.

Please refer to FIG. 8, which is a cross-sectional view of a third embodiment of the capacitive touch panel of the present invention. The capacitive touch panel 80 comprises a substrate 81, an X-axis pattern layer 82, a plurality of X-axis electrodes 83, a Y-axis pattern layer 84, a plurality of Y-axis electrodes 85, and a protection layer 86. In the third embodiment, the X-axis electrode 83 and the Y-axis electrode 85 are formed on different surfaces of the substrate 81 respectively. The X-axis electrode 83 and the Y-axis electrode 85 are orthogonal to each other. Because there are undercuts formed at edges of the pattern layer 82, which make an angle 87 of the edge less than 90 degrees, the X-axis electrodes 83 formed on the pattern layer 82 are separated from the X-axis electrodes 83 formed on the substrate 81 by the pattern layer 82. Therefore, there is no seam between the X-axis electrodes 83. Similarly, the Y-axis electrodes 85 formed on the pattern layer 84 are separated from the Y-axis electrodes 85 formed on the substrate 81 by the pattern layer 84. Therefore, there is no seam between the Y-axis electrodes 85. In addition, a quantity of the X-axis electrodes 83 and the Y-axis electrodes 85 in FIG. 8 is twice a quantity of the X-axis electrodes 74 and the Y-axis electrodes 75 in FIG. 7, such that the capacitive touch panel 80 has higher resolution.

Figure 9:
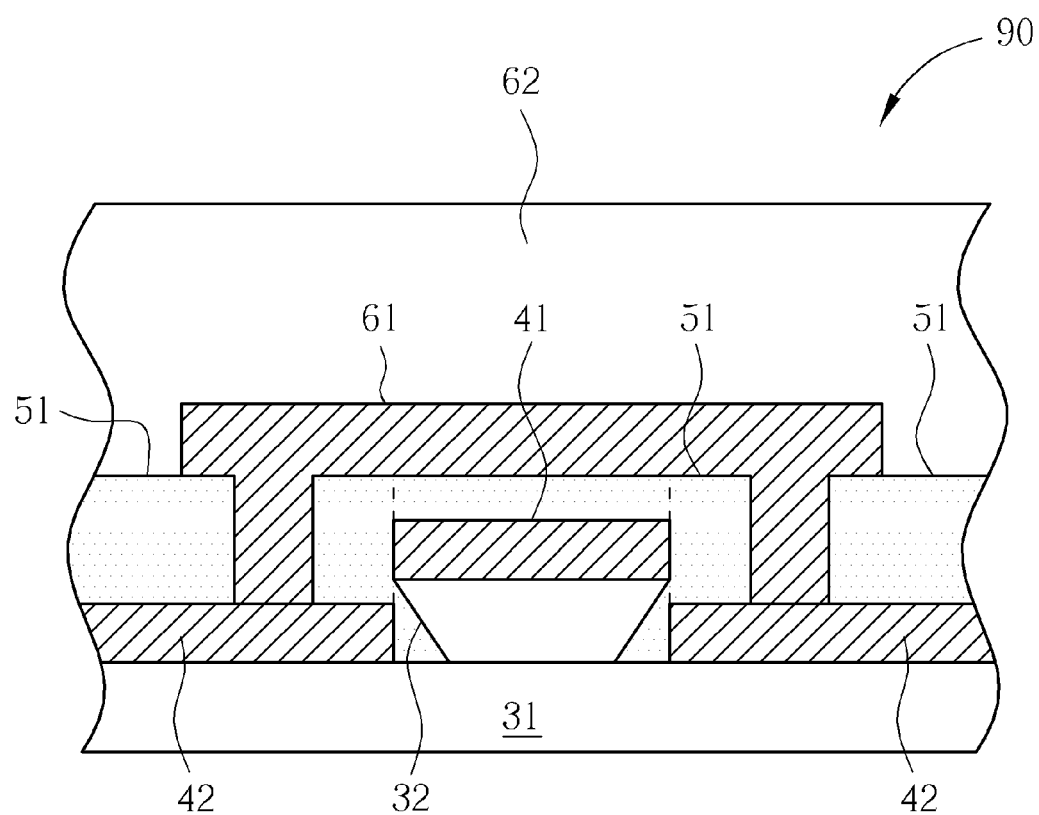
FIG. 9 is a cross-sectional view of a fourth embodiment of the capacitive touch panel of the present invention.

Please refer to FIG. 9, which is a cross-sectional view of a fourth embodiment of the capacitive touch panel of the present invention. The capacitive touch panel 90 is similar to the capacitive touch panel 60 in FIG. 6. Different from the capacitive touch panel 60 in FIG. 6, the orthographic projection of the X-axis electrode of the capacitive touch panel 90 adjoins the orthographic projection of the Y-axis electrode 42 of the capacitive touch panel 90.

Summarizing the above, the capacitive touch panel of the present invention utilizes the pattern layer to separate the electrodes, such that there is no seam between the electrodes, and further improves image quality of the touch screen. The X-axis electrodes and the Y-axis electrodes can be installed on the same side or different sides of the substrate. When the X-axis electrodes and the Y-axis electrodes are installed on the same side of the substrate, the X-axis electrodes are formed on the pattern layer, such that the X-axis electrodes and the Y-axis electrodes are separated by the pattern layer for preventing conduction between the X-axis electrodes and the Y-axis electrodes. And there is no seam between the X-axis electrodes and the Y-axis electrodes. When the X-axis electrodes and the Y-axis electrodes are installed on different sides of the substrate, the X-axis electrodes and the Y-axis electrodes are separated from each other by the X-axis pattern layer and the Y-axis pattern layer respectively. Therefore, there is no seam between the X-axis electrodes and the Y-axis electrodes, and a quantity of the X-axis electrodes and the Y-axis electrodes is doubled to provide higher resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive touch panel, comprising:
   a substrate, having a surface;
   a raised pattern layer formed directly on a first portion of the surface of the substrate, the raised pattern layer having a bottom surface, a top surface opposite to the bottom surface, and a surrounding edge connected between the top surface and the bottom surface;
   a first electrode formed directly on the top surface of the pattern layer; and
   a second electrode formed directly on a second portion of the surface of the substrate adjacent to the raised pattern layer so that a capacitance is formed between the first electrode and the second electrode;
   wherein the second electrode and the first electrode are disposed at different heights on the substrate and separated by the raised pattern layer for preventing conduction between the first and second electrodes and reducing of a seam between the first and second electrodes when viewing from a top.

2. The capacitive touch panel of claim 1, wherein an orthogonal projection of the first electrode is adjacent to an orthogonal projection of the second electrode.

3. The capacitive touch panel of claim 1, wherein an orthogonal projection of the first electrode adjoins an orthogonal projection of the second electrode.

4. The capacitive touch panel of claim 1, wherein the pattern layer is made of photoresist.

5. The capacitive touch panel of claim 1, wherein the first and second electrodes are made of transparent conductive material consisting of indium tin oxide (ITO), antimony tin oxide (ATO), indium zinc oxide (IZO), aluminum zinc oxide (AZO), gallium zinc oxide (GZO), micaceous iron oxide (MIO), or metal oxide selected from titanium oxide, zinc oxide, zirconium oxide, antimony oxide, indium oxide, tin oxide, aluminum oxide, or silicon oxide.

6. The capacitive touch panel of claim 1, further comprising:
   an isolating layer formed on the first electrode and the second electrode; and
   a conductive layer formed on the isolating layer for electrically connecting a section of the second electrode to another section of the second electrode separated by the pattern layer via through holes formed on the isolating layer.

7. The capacitive touch panel of claim 1, further comprising:
   a conductive layer formed beneath the pattern layer for electrically connecting a section of the second electrode to another section of the second electrode separated by the pattern layer.

8. The capacitive touch panel of claim 1, wherein the first electrode and the second electrode are orthogonal to each other.

9. The capacitive touch panel of claim 1, wherein an undercut is formed at the surrounding edge of the raised pattern layer.

10. The capacitive touch panel of claim 9, wherein an area of the top surface is greater than an area of the bottom surface to form the undercut.

11. The capacitive touch panel of claim 1, wherein the substrate is a substrate of a display panel integrated with the capacitive touch panel.

12. The capacitive touch panel of claim 11, wherein the substrate is a color filter glass substrate of the display panel.

13. A method of fabricating a capacitive touch panel, comprising the steps of:
   forming a raised pattern layer directly on a first portion of a surface of a substrate, the raised pattern layer having a bottom surface, a top surface opposite to the bottom surface, and a surrounding edge connected between the top surface and the bottom surface;
   forming a first electrode directly on the top surface of the pattern layer; and
   forming a second electrode directly on a second portion of the surface of the substrate;
   wherein the second electrode and the first electrode are disposed at different heights on the substrate and separated by the raised pattern layer for preventing conduction between the first and second electrodes and reducing of a seam between the first and second electrodes when viewing from a top.

14. The method of claim 13, further comprising:
   forming an isolating layer on the first electrode and the second electrode; and
   forming a conductive layer on the isolating layer for electrically connecting a section of the second electrode to another section of the second electrode separated by the pattern layer via through holes formed on the isolating layer.

15. The method of claim 13, further comprising:
forming a conductive layer beneath the pattern layer for electrically connecting a section of the second electrode to another section of the second electrode separated by the pattern layer.

16. The method of claim 13, wherein the substrate is a substrate of a display panel integrated with the capacitive touch panel.

17. The method of claim 16, wherein the substrate is a color filter glass substrate of the display panel.

* * * * *